United States Patent Office 3,028,409
Patented Apr. 3, 1962

3,028,409
2-CARBOXAMIDO-N-(ALKYL) SUBSTITUTED
ANHYDROTETRACYCLINE COMPOUNDS
Charles R. Stephens, Jr., Waterford, Conn., assignor to
Chas. Pfizer & Co., Inc., New York, N.Y., a corporation of Delaware
No Drawing. Filed Aug. 5, 1959, Ser. No. 831,696
7 Claims. (Cl. 260—456)

This invention is concerned with a process for the preparation of certain novel organic compounds and with the organic compounds so prepared. In particular, it is concerned with the preparation of certain derivatives of the tetracycline-type antibiotics, chlortetracycline, and tetracycline. This application is a continuation-in-part of copending application Serial Number 507,123 filed May 9, 1955, and now abandoned.

The reaction or process with which we are concerned comprises the condensation of decarboxamido 2-cyanotetracycline and decarboxamido 2-cyanochlortetracycline with certain organic substances, particularly olefinic compounds or derivatives of these such as the corresponding alcohols. The olefines employed in this process have up to about ten carbon atoms and at least one of the unsaturated carbon atoms is substituted by an alkyl group or an aryl group. Cycloolefines may also be employed. Secondary or tertiary aliphatic alcohols, or cycloalkanols, containing up to about ten carbon atoms are also operable, as well as esters of such alcohols. Certain primary alcohols (or esters thereof) such as benzyl alcohol are also useful, as are other α-aryl-substituted alkanols, β-aryl-substituted tertiary alkanols and β-aryl-substituted secondary alkanols containing up to about ten carbon atoms. The alcohols and esters act as sources of the corresponding olefins or of carbonium cations under the conditions of the reaction and are, therefore, to be considered as included within the term "an olefinic compound."

The nitriles used as starting materials in the present process are prepared according to the directions of the copending patent application Serial No. 411,567, filed on February 19, 1954, by Charles R. Stephens, Jr., and now abandoned. In the process disclosed therein, the tetracycline-type compound is treated with an arylsulfonyl halide in the presence of an organic base to convert the carboxamido group to the nitrile group.

The present process is conducted in the prescence of a strong acid, such as concentrated sulfuric acid, p-toluenesulfonic acid, hydrogen chloride, or other similar material. The reaction may be run in a solvent which is inert to the reactants and the products, as well as to the strong acid used as a condensation agent. The presence of the solvent helps to control the reaction and thus prevents too rapid a rise in temperature which may be destructive to the nitriles and may cause polymerization of the olefin. The solvent may be polar, such as acetic acid, or may be relatively non-polar, such as various ethers, that is, dioxane, tetrahydrofurane, dipropyl ether, diisobutyl ether, and so forth. In general, in the operation of the present process at least about a molar quantity each of the nitrile and of the olefinic compound are used together with an excess of the strong acid condensation agent.

The process of the present invention may be illustrated by the following formulas:

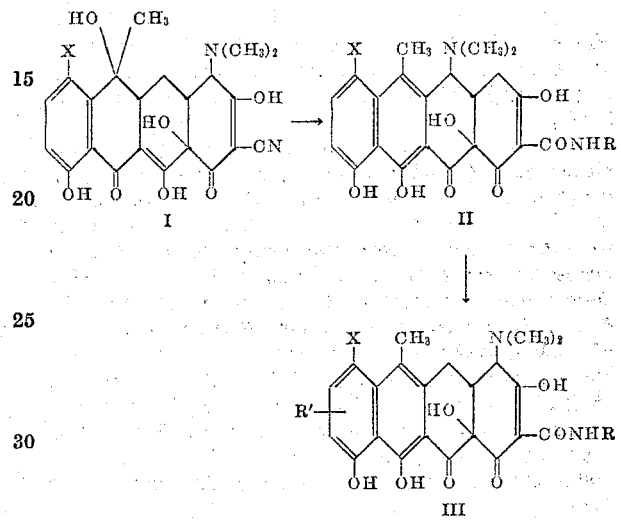

In the above formulas, X may be H or chlorine. R and R' are alkyl groups or substituted alkyl groups which may be the same or different.

Compound I is a typical nitrile starting material. Compound II is the product formed by condensation of one molecule of olefin or derived material such as a tertiary alcohol with one molecule of the nitrile followed by dehydration. Compound III is the product formed by condensation of Compound II with a second molecule of the olefin. The intermediate product, II, may be isolated by stopping the reaction at a suitable stage. In some cases it is necessary to appreciably elevate the temperature of the reaction mixture to cause it to proceed to Compound III. A different alkyl group may be substituted in the molecule in the second stage of the process from that of the first. It should be noted that in the first stage of the process, a molecule of water is cleaved from the tetracycline antibiotic structure at the 5a–6 position and the molecule tautomerizes to form the anhydro derivative. The dehydration may be conducted in a separate step before the condensation. The exact position at which the second substituted group enters the molecule is not certain but it seems most likely that it is in the end ring, possibly at the 9-position.

The reaction products of the present process, that is, compounds of the type II and III above, are active antimicrobial agents. Certain of these compounds have been shown to be particularly active against Trichomonas, such as *Trichomonas vaginalis*, which cause serious infections in humans and other animals. The novel products of the present invention may be represented by the following formula:

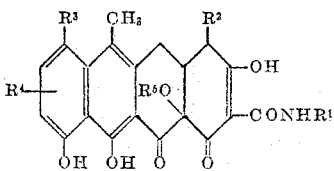

wherein $R^1$ is alkyl, cycloalkyl or aralkyl; $R^2$ is hydrogen or dimethylamino; $R^3$ is hydrogen or chlorine; $R^4$ is hydrogen, alkyl, cycloalkyl or arlkyl; and $R^5$ is acyl or hydrogen.

It has been noted above that the tetracycline antibiotic nitriles may be utilized as starting materials for the present process. Certain derivatives of these compounds may also be utilized as starting materials. In particular, we refer to the anhydro compounds formed from the nitriles by treatment with a strong acid, such as hydrochloric acid, in a solvent which is stable under the conditions of the reaction, for instance, ethanol. A molecule of water is readily cleaved from the 5a–6 position of these compounds leaving the dehydrated nitrile. Furthermore, nitriles of various derivatives of the tetracycline antibiotics may also be employed. These include the desdimethylamino compounds, the esters of the compounds (with aliphatic acids, arylsulfonic acids, etc.) and so forth.

In conducting the present process, the starting material, that is, the nitrile, may be dissolved in the solvent, for instance, acetic acid, and the olefinic compound or corresponding alcohol may be added. The mixture is then cooled, for instance to a temperature of from about 5° C. to about 15° C. The strong acid which is to be used as a condensation agent may then be gradually added, maintaining the low temperature and stirring the reaction mixture throughout the addition. After the acid condensation agent has been added, the temperature of the reaction mixture may be maintained at the low temperature for a period of from about 5 to about 40 hours. Care must be taken to avoid extensive polymerization of the olefinic compound. If some polymer is found, it may be extracted by a hydrocarbon solvent, e.g. pentane, hexane, etc.

The condensation product obtained from one molecule of the olefin or equivalent compound with one molecule of the nitrile may then be isolated by adding the reaction mixture to ice and stirring the mixture. Adjustment of the pH to a value of around 5 to 6 will facilitate the separation of the solid product from the aqueous system. This may be isolated by extraction or filtration. Often the products are obtained in crystalline form by this simple process. Alternatively, the material, if obtained in crude, non-crystalline form, may be further purified by crystallization from a solvent or by other methods. Frequently, an even more convenient procedure is to add an excess of a non-solvent such as di-ethyl ether or benzene to the reaction solution and isolate the solid which separates.

As noted above, a variety of olefins and related compounds may be used in the present process. These include aliphatic olefins, cyclo olefins, aryl substituted olefins and derived compounds, such as isobutylene, diisobutylene, octenes, tertiary butanol, camphene, dimethylbenzyl carbinol, benzyl alcohol, secondary amyl alcohol, hexenes, heptenes, allylbenzene, etc.

If it is desired to form the product of the type III above, the temperature of the reaction mixture may be maintained at a somewhat higher temperature, that is, from about 20 to about 40° C., for a period of from 20 to 100 hours. It should be understood that the rate of reaction of the nitriles, that is, of the tetracycline nitrile, and chlortetracycline nitrile, or the derived compounds, varies to some extent.

The compound repesented by figure III above may be isolated in exactly the same manner as that used for Compound II. It should be noted that these compounds, that is, both II and III, form salts with a variety of acids except when using the desdimethylamino compounds as starting material. These compounds also form salts with metals, particularly with the alkali metals, such as sodium, potassium cesium, lithium and so forth, and with the alkaline earth metals, calcium, strontium, barium, and so forth. Complex derivatives of metallic salts, such as calcium chloride, magnesium chloride, nickel chloride, iron chloride, antimony trichloride and a variety of other metallic salts of this nature may also be prepared. The acids which may be utilized for the formation of salts from the compounds of the type II and III above include inorganic acids, such as hydrochloric acid, hydrobromic acid, hydriodic acid, phosphoric acid, sulfuric acid, nitric acid, and others of this nature, as well as strong organic acids, such as p-toluenesulfonic acid, and so forth.

The reaction products of the present process, structures II and III above, are active antimicrobial agents have certain advantages over the parent antibiotic compounds and over the corresponding anhydro compounds. One such advantage shared by many of the present materials over both the parent tetracycline antibiotics and the anhydro compounds is derived from differences in their antimicrobial spectra which facilitate their use in the treatment of trichomonas vaginitis. The present materials are highly active against *Trichomonas vaginalis* but they have reduced antibacterial activity particularly against Gram negative species. Anhydrochlortetracycline and anhydrotetracycline, which are also active against *Trichomonas vaginalis* although to a somewhat lesser degree, have very strong antibacterial activity. For the treatment of trichomonas vaginitis, this is disadvantageous since a disruption of the normal bacterial flora of the affected organ results making possible fungal overgrowths, which are frequently more troublesome than the original infection. With the agents of the present invention, the effect on the normal bacterial population iis minimized while the infection by *T. vaginalis* is inhibited.

A further advantage of these new compounds for the above use is that they are less soluble in water than the parent compounds. Thus for topical and non-systemic applications such as the treatment of trichomonas vaginitis, less of the material is dissolved, thus reducing absorption and irritation, and the active ingredient is not readily washed from treated surfaces.

The antibacterial and antitrichomonal activities of anhydrotetracycline, t-butyl anhydrotetracycline, di-t-butyl anhydrotetracycline, and the corresponding chlortetracycline derivatives are compared in Table I,

TABLE I

*Minimum Inhibitory Concentrations, mcg./ml.*

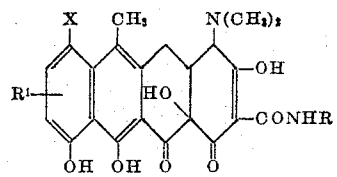

| Organism | (1) X=H R=H R'=H | (2) X=H R=C₄H₉ R'=H | (3) X=H R=C₄H₉ R'=C₄H₉ | (4) X=Cl R=H R'=H | (5) X=Cl R=C₄H₉ R'=H | (6) X=Cl R=C₄H₉ R'=C₄H₉ |
|---|---|---|---|---|---|---|
| T. vaginalis [1] | 6.25 | 1.56 | 0.78 | 6.25 | 0.78 | 0.78 |
| A. aerogenes | 3.12 | >100 | 100 | 6 | >100 | >100 |
| E. coli | 3.12 | >100 | 100 | 12 | >100 | >100 |
| S. typhosa | 3.12 | >100 | 100 | 6 | >100 | >100 |
| S. paratyphi A | 3.12 | | | 6 | >100 | >100 |
| S. paratyphi B | 6.25 | | | | >100 | >100 |
| K. pneumoniae | 3.12 | >100 | 100 | 12 | >100 | >100 |
| B. bronchiseptica | 3.12 | | | 12 | >100 | >100 |
| P. vulgaris | 6.25 | >100 | >100 | >100 | >100 | >100 |
| P. aeruginosa | 50 | >100 | 100 | >100 | 100 | >100 |
| S. pyogenes | | 1.56 | 100 | | | |
| M. pyogenes var. aureus | 0.78 | 0.39 | | 6 | 3.12 | >100 |
| M. pyogenes var. aureus 376 | | 3.12 | 100 | | | |
| M. pyogenes var. aureus M/r | | 0.78 | 100 | | | |
| M. pyogenes var. aureus P/r | | 1.56 | 100 | | | |
| M. 607 | 0.28 | 1.56 | 12.5 | | 50 | >100 |
| M. berolinense | | 3.12 | 12.5 | | 25 | >100 |
| B. subtilis | 0.78 | 0.09 | 50 | 0.39 | 0.78 | >100 |
| S. faecalis | 1.56 | 0.78 | 100 | 1 | 0.78 | >100 |

[1] Tetracycline and chlortetracycline have values of 125 and 500 mcg./ml., respectively.

The invitro evaluation of antitrichomonal activity was carried out in simplified trypticase serum medium (A. B. Kupferberg et al., Proceedings of the Society for Experimental Biology and Medicine, 67, 304 (1948). A 0.05 ml. aliquot of 48 hr. old cultures of T. vaginalis containing approximately 150,000 actively motile organisms was inoculated into each tube. The ten tube two-fold serial dilution technique was used and the minimum inhibitory concentration (MIC) determined after a 48-hour incubation period at 37° C. The antibacterial results were obtained by a standard serial dilution procedure.

It is apparent from this table that chlortetracycline and tetracycline have very low antitrichomonal activities. Anhydrotetracycline and anhydrochlortetracycline, columns 1 and 4, having a reasonable degree of in vitro activity but lower for instance than that of the t-butyl compounds of the present invention, columns 2, 3, 5 and 6. The corresponding reduction in antibacterial activity for the present substances is also apparent.

The in vitro antitrichomonal activity was confirmed in vivo in mice. Infections were produced by inoculating T. vaginalis into the dorsal subcutaneous tissue of albino mice. In each instance the number of trichomonads inoculated was approximately 1.5 million. Drugs were administered at the site of infection commencing 24 hours after inoculation and were continued once daily for five consecutive days. The mice were held for two days after the completion of the treatment and were then sacrificed and examined macroscopically for abcess formation and microscopically for the presence of T. vaginalis. By this technique the various t-butyl derivatives of anhydrotetracycline and anhydrochlortetracycline cleared 70–75% of the mice of the infection at a dosage level of 300 mg./kg.

For use of the compounds of the present invention in the treatment of trichomonas vaginitis topical application in the form of jellies, solutions, insufflation powders, or vaginal tablets is convenient and effective. Jellies may be prepared from a petroleum base containing lactose or other active ingredients and excipients in addition to a product of the present invention. Similarly, powders can be prepared comprising various inert carriers such as talc along with lactose, various wetting agents, etc. A concentration of about 0.1% of one of the new tetracycline compounds is recommended for both of these forms.

Vaginal tablets are prepared weighing, for example, about 1.5 g. and containing about 1.0 to 1.2 g. of lactose and the balance made up of various detergents, wetting agents and buffers in addition to the active ingredient. Such a tablet advantageously then contains from about 5 to 10 mg. of one of the valuable substituted anhydrotetracyclines of the present invention and buffers to afford a pH of about 4.5.

It has been pointed out above that these new compounds form salts with a variety of acids and bases. For the therapeutic use of the products of the present invention in the form of salts, it is desirable to employ pharmacologically acceptable metal or acid addition salts. By pharmacologically acceptable salts is meant those containing acids and metals which are non-toxic at the concentrations necessary in drug treatment with the salts.

The following examples are provided to further illustrate the specific manner in which the present invention is practiced. Many variations, of course, are possible without departing from the spirit and scope thereof.

EXAMPLE I

*Carboxamido-N-t-Butylanhydrochlortetracycline*

A mixture of 10 grams of chlortetracycline nitrile and 100 ml. of glacial acetic acid was treated with 18 ml. of concentrated sulfuric acid. The mixture was then cooled to 15° C. and 9 grams of isobutylene gas was added by bubbling the gas into the cooled liquid. The mixture was maintained for 16 hours at 5° C. The solution was then shaken with an equal volume of a technical mixture of pentanes and hexanes. The hydrocarbon layer was separated. It contained some polyisobutylenes. The acetic acid phase was poured into 1000 ml. of ice water. The mixture was then neutralized with dilute sodium hydroxide and the product was extracted with three 250 ml. portions of chloroform. The chloroform extract was washed with water, dried and concentrated under vacuum. Tertiary-butylanhydrochlortetracycline separated as a crystalline product. The melting point was approximately 227–230° C. with decomposition and previous darkening.

*Analysis.*—Calcd. for $C_{26}H_{29}N_2O_7Cl$: C, 60.5; H, 5.7; N, 5.3; Cl, 6.9. Found: C, 60.9; H, 5.9; N, 5.3; Cl, 6.7.

The minimum inhibitory concentration of this material against *Trichomonas vaginalis* in a standard test was found to be 0.78 mcg./ml.

EXAMPLE II

*t-Butyl-Carboxamido-N-t-Butylanhydrochlortetracycline*

The process described in Example I was repeated but the reaction mixture was allowed to stand for three days at room temperature. The product was isolated in the same manner. It was found to decompose at a temperature above 202° C.

*Analysis.*—Calcd. for $C_{30}H_{37}N_2O_7Cl$: C, 63.0; H, 6.47; N, 4.89. Found: C, 62.92; H, 6.61; N, 4.92.

Minimum inhibitory concentration against *Trichomonas vaginalis* was found to be 0.78 mcg./ml.

EXAMPLE III

*t-Butyl-Carboxamido-N-t-Butylanhydrotetracycline*

The process of Example I was repeated utilizing in place of chlortetracycline nitrile, an equal amount of tetracycline nitrile. After twenty-four hours at 5° C., the product was isolated. It had a melting point of 190–195° C. with decomposition.

*Analysis.*—Calcd. for $C_{30}H_{38}N_2O_7$: C, 69.9; H, 7.07; N, 5.2. Found: C, 66.9; H, 7.2; N, 5.2.

The minimum inhibitory concentration against *Trichomonas vaginalis* was found to be 1.56 mcg./ml.

EXAMPLE IV

*Carboxamido-N-t-Butylanhydrotetracycline-10-Benzenesulfonate*

The process described in Example I was repeated utilizing 10-benzenesulfonate anhydrotetracycline nitrile as starting material. The reaction mixture was allowed to stand for two days at 5° C. The melting point of the isolated product was 200–202° C.

*Analysis.*—Calcd. for $C_{32}H_{34}N_2O_9S$: C, 61.73; H, 5.50; N, 4.50; S, 5.14. Found: C, 61.9; H, 5.8; N, 5.40; S, 5.15.

The activity of this compound against *Trichomonas vaginalis* was 25 mcg./ml.

It was found that the benzenesulfonate ester product was converted to the tertiary-butylanhydrotetracycline by treatment was pyrrolidine.

EXAMPLE V

*Carboxamido-N-(Benzyldimethylcarbinyl) Anhydrochlortetracycline*

The process of Example I was repeated using 0.02 mole of benzyl dimethylcarbinol in place of the isobutylene. The product was isolated as a solid which proved to be inhibitory of various bacteria.

EXAMPLE VI

*Carboxamido-N-t-Butylanhydrochlortetracycline*

The process of Example I was repeated, this time substituting 0.025 mole of t-butanol for the isobutylene and propionic acid for acetic acid. After 36 hours at 10° C., the previously described isolation procedure afforded the same product as that obtained in Example I.

EXAMPLE VII

*t-Amyl-Carboxamido-N-t-Amylanhydrotetracycline*

The process of Example II was repeated, employing tetracycline nitrile and 2-methyl butene-2 as the reactants in diisobutyl ether as the solvent. The product was isolated as a solid which was inhibitory of various bacteria.

EXAMPLE VIII

*Carboxamido-N-(α-Phenethyl)Anhydrotetracycline*

In the manner of Example I, tetracycline nitrile was combined with 0.025 mole styrene in glacial acetic acid together with concentrated sulfuric acid at 5° C. The solid product, found upon analysis to be α-phenylethyl anhydrotetracycline, possessed antimicrobial activity.

When α-methyl styrene was substituted for styrene, α,α-dimethylbenzyl anhydrotetracycline was obtained in similar fashion.

EXAMPLE IX

*Carboxamido-N-(α-Octylethyl)Anhydrochlortetracycline*

This compound was prepared and isolated by the procedure of Example I, with the substitution of octylethylene for isobutylene. The isolated product was found to possess antimicrobial activity.

EXAMPLE X

*Secondary-Octyl-Carboxamido-N-Secondary-Octyl-Anhydrotetracycline*

According to the procedure of Example II, this antimicrobial compound was obtained by the reaction of anhydrotetracycline nitrile and octanol-2 in glacial acetic acid at 25° C. for 100 hours, followed by isolation as previously described.

EXAMPLE XI

*Carboxamido-N-t-Decylanhydrotetracycline*

Following the previously described procedures, t-decylanhydrotetracycline was prepared by the reaction of tripropyl carbinol and tetracycline nitrile in dioxane at 15° C. for 40 hours in the presence of concentrated sulfuric acid. The isolated product was inhibitory of various microorganisms.

EXAMPLE XII

*Benzyl-Carboxamido-N-Benzylanhydrochlortetracycline*

A mixture of 10 grams of chlortetracycline nitrile and 100 ml. glacial acetic acid was treated with 18 ml. of concentrated sulfuric acid and, after cooling to 15° C., with 0.05 mole benzyl alcohol. After standing for 4 days at room temperature the dibenzyl derivative was isolated according to the procedure of Example I.

EXAMPLE XIII

*Carboxamido-N-(α,α-Dimethyl-p-Methylbenzyl) Anhydrotetracycline*

10 grams of tetracycline nitrile in 100 ml. glacial acetic acid was treated with cooling with concentrated sulfuric acid followed by 0.025 mole dimethyl tolyl carbinol. The mixture was maintained at 5° C. until the reaction was substantially complete, whereupon the antimicrobial product was isolated by the previously described procedures.

In like manner, the (α,α-dimethyl benzyl) anhydrotetracycline was obtained from the tetracycline nitrile and dimethyl phenyl carbinol.

EXAMPLE XIV

*Carboxamido-N-Cyclohexylanhydrotetracycline*

This compound was prepared following the same procedure as Example XIII, with the substitution of cyclohexanol in place of the dimethyl tolyl carbinol.

The same product was also obtained by the reaction of cyclohexene with the tetracycline nitrile.

EXAMPLE XV

*Carboxamido-N-Cyclopentylanhydrochlorotetracycline*

This product was obtained by the reaction of cyclopentene and chlortetracycline nitrile in acetic acid at 5° C. according to the procedure described in Example I. Substitution of cyclooctene for cyclopentene yielded the corresponding N-cyclooctyl derivative in like manner.

EXAMPLE XVI

*α-Phenethyl-Carboxamido-N-(α-Phenethyl) Anhydrotetracycline*

0.05 mole of α-phenyl ethyl alcohol was caused to react at 35° C. with 10 grams of tetracycline nitrile in acetic acid according to the procedure of Example II. The isolated product was found to possess inhibitory activity with respect to a variety of microorganisms.

EXAMPLE XVII

*Carboxamido-N-Isopropylanhydrotetracycline*

This product was obtained by the reaction as in Example I of propylene and tetracycline nitrile in a pressure vessel for 2 days at 5° C. in glacial acetic acid solvent.

EXAMPLE XVIII

*Carboxamido-N-(Methyl-p-Methylbenzylcarbinyl) Anhydrotetracycline*

The process of Example I was repeated using 0.02 mole of methyl (p-methylbenzyl) carbinol in place of the isobutylene. The product was isolated as a solid which proved to be inhibitory of various bacteria.

EXAMPLE XIX

*Decarboxamido-2-Cyano-Chlortetracycline*

A slurry of 2.0 g. of amphoteric chlorotetracycline in 6 ml. of pyridine was stirred in a water bath and treated with 3.0 g. of p-toluenesulfonyl chloride. The solid dissolved rapidly, and the temperature rose to 60° in 45 seconds, then began to fall. The solution was rapidly cooled in an ice bath to 33° C. over 1¼ minutes. After a total reaction time of only 2 minutes, the mixture was diluted with 50 ml. of water, and the crystalline precipitate which separated was dissolved in 15 ml. of dimethylformamide and treated with 40 ml. of acetone. Pure chlortetracycline nitrile separated rapidly as pale yellow plates, wt. 0.6 g. (31% yield).

EXAMPLE XX

*Decarboxamido-2-Cyano-Tetracycline*

This compound was prepared by the method of Example XIX substituting an equivalent amount of tetracycline. It was isolated as a yellow crystalline product.

What is claimed is:

1. A compound of the group consisting of carboxamido N-(R) anhydrotetracycline, carboxamido N-(R) anhydrochlortetracycline, R'-carboxamido N-(R) anhydrotetracycline and R'-carboxamido N-(R) anhydrochlortetracycline wherein each of R and R' is a substituent containing up to 10 carbon atoms and is selected from the group consisting of tertiary-alkyl, secondary-alkyl, cycloalkyl, $\alpha$-(aryl)alkyl, $\beta$-(aryl)tertiary alkyl and $\beta$-(aryl) secondary alkyl, each said R' substituent being a D-ring nuclear substituent.

2. Carboxamido N-(tertiary-butyl) anhydrotetracycline.

3. Carboxamido N-(tertiary-butyl) anhydrochlortetracycline.

4. D-ring nuclearly substituted carboxamido-N-(tertiary-butyl) anhydrotetracycline, said D-ring nuclear substituent being tertiary-butyl.

5. D-ring nuclearly substituted carboxamido-N-(tertiary-butyl)anhydrochlortetracycline, said D-ring nuclear substituent being tertiary-butyl.

6. Carboxamido N-(tertiary-butyl) anhydrotetracycline-10-benzene sulfonate.

7. Carboxamido N-(benzyldimethylcarbinyl) anhydrochlortetracycline.

References Cited in the file of this patent

UNITED STATES PATENTS 2,895,993     Stephens _____ July 21, 1959

FOREIGN PATENTS 1,015,796     Germany _____ Sept 19, 1957

OTHER REFERENCES

Hill and Kelley: "Org. Chem.," pages 303–305, The Blakiston Co., Philadelphia (1943).

Ritter: J. Am. Chem. Soc., 70, pages 4045–8 (1948).

Noller: "Chem. of Organic Compounds," pages 238–239, W. B. Saunders Co., Philadelphia (1951).

Lynch et al.: "Antibiotics Annual," pages 466–472 (1955/1956).